(12) United States Patent
Toews et al.

(10) Patent No.: US 11,661,821 B2
(45) Date of Patent: May 30, 2023

(54) DRILLING FLUID COMPOSITION AND METHOD FOR COOLING IN HIGH TEMPERATURE FORMATIONS

(71) Applicant: EAVOR TECHNOLOGIES INC., Calgary (CA)

(72) Inventors: Matthew Toews, Calgary (CA); Michael Holmes, Calgary (CA)

(73) Assignee: Eavor Technologies Inc., Calgary (CA)

( * ) Notice: Subject to any disclaimer, the term of this patent is extended or adjusted under 35 U.S.C. 154(b) by 56 days.

(21) Appl. No.: 17/094,929

(22) Filed: Nov. 11, 2020

(65) Prior Publication Data
US 2021/0164327 A1 Jun. 3, 2021

Related U.S. Application Data

(60) Provisional application No. 62/941,906, filed on Nov. 29, 2019.

(51) Int. Cl.
*E21B 36/00* (2006.01)
*E21B 43/25* (2006.01)
*E21B 43/12* (2006.01)
*C09K 8/28* (2006.01)

(52) U.S. Cl.
CPC ............. *E21B 36/001* (2013.01); *C09K 8/28* (2013.01); *E21B 43/12* (2013.01); *E21B 43/25* (2013.01)

(58) Field of Classification Search
CPC ...... E21B 36/001; E21B 43/16; E21B 21/003; E21B 21/08; E21B 43/12; E21B 47/07; E21B 36/00
See application file for complete search history.

(56) References Cited

U.S. PATENT DOCUMENTS

| 9,016,374 | B2 | 4/2015 | Quintero et al. |
| 9,758,711 | B2 | 9/2017 | Quintero |
| 2005/0104029 | A1 | 5/2005 | Neuscuetz |
| 2008/0277162 | A1 | 11/2008 | Di Foggio |
| 2015/0218432 | A1* | 8/2015 | Quintero .................. C09K 8/84 507/100 |

FOREIGN PATENT DOCUMENTS

AU 2009302291 A1 * 4/2010 ............. E21B 10/00

OTHER PUBLICATIONS https://www.slb.com/drilling/bottomhole-assemblies/directional-drilling/powerdrive-ice-ht-rotary-steerable-system undated.
https://pdfs.semanticscholar.org/9f0e/a2af4b60d04e18e1ce7a8c828e96fe6d8d67.pdf undated.
Kahraman, et al., Dominant rock properties affecting the penetration rate of percussive drills, International Journal of Rock Mechanics & Mining Sciences 40 (2003) 711-723.

(Continued)

*Primary Examiner* — Zakiya W Bates
(74) *Attorney, Agent, or Firm* — Fish & Richardson P.C.

(57) ABSTRACT

Methods for drilling in higher temperature rock formations such as geothermal formations with phase change material augmented drilling fluid include observing flow rate of the augmented fluid. Heat exchange between the annulus returning fluid and tubular fluid can be minimized thereby facilitating a cooler fluid for contact with a rock face being drilled. The cooling assists in pre-fracturing the rock face prior to destruction by the drill bit.

16 Claims, 8 Drawing Sheets

(56) References Cited

OTHER PUBLICATIONS

Nguyen Van Hung, et al., Penetration rate prediction for percussive drilling with rotary in very hard rock. Journal of Science and Technology, Vietnam Academy of Science and Technology, 2016, 54 (1), pp. 133-149.

Monteiro, et al., Temperature Control of Drilling Fluid with Phase-Change Materials. AIChE Annual Meeting, Conference Proceedings., 2012.

Yan-Jun Shen, et al. Experimental Study on Temperature Change and Crack Expansion of High Temperature Granite under Different Cooling Shock Treatments, Energies, 2019.

PCT International Search Report and Written Opinion in International Appln. No. PCT/CA2020/000125, dated Mar. 3, 2021, 9 pages.

Office Action in Canada Appln. No. 3,097,436, dated Oct. 28, 2022, 4 pages.

* cited by examiner

DRILLING FLUID COMPOSITION AND METHOD FOR COOLING IN HIGH TEMPERATURE FORMATIONS

FIELD OF THE INVENTION

The present invention relates to a drilling fluid composition and more particularly, the present invention relates to such compositions and methods of utilization for increasing the rate of penetration during drilling in high temperature formations.

BACKGROUND OF THE INVENTION

A drilling fluid has several functions, which include as some of the key functions:
a) Transport cuttings to surface;
b) Prevent well-control issues;
c) Preserve wellbore stability;
d) Minimize formation damage;
e) Cool the Bottom Hole Assembly and lubricate the drill string;
f) Provide information about the wellbore; and
g) Minimize risk to personnel, the environment, and drilling equipment.

Cooling the bottom hole assembly (BHA) is a primary consideration for geothermal wells and deep oil and gas wells which penetrate hot rock. Modern directional drilling equipment contains complex sensors, electronics, and mechanical equipment near the drill bit. All of these components have temperature limitations, usually driven by electronics and mechanical stresses.

Standard directional drilling uses a downhole mud motor (widely recognized as a positive displacement pump) in conjunction with a bent sub. In 2019, standard mud motors and directional electronics are limited to 150° C. The highest temperature rated and more expensive mud motors are limited to 180° C. Above 180° C., one must revert to an SLB Rotary Steerable System (RSS) rated to 200° C., an example of which is (https://www.slb.com/drilling/bottomhole-assemblies/directional-drillinWpowerdrive-ice-ht-rotary-steerable-system). Due to the unique electronics and ruggedized equipment, such systems cost several times more than standard equipment.

Another important consideration for cooling is longevity and performance of the drill bit. This is discussed in (https://pdfs.semanticscholar.org/9f0e/a2af4b60d04e18e1ce7a8c828e96fe6d8d67.pdf). As temperature increases, the rock cutting component, typically polycrystalline diamond compact, fails more readily due to differential thermal expansion of material within the cutter and bit. Therefore, if the drilling fluid cannot cool the bit effectively, a reduced rate of penetration and premature failure occur.

Current state-of-the-art drilling fluids cannot cool the bit effectively in a closed system (i.e. —where the fluid loss into permeable geological layers is not material). In a closed system or nearly-closed system, the drilling fluid exits the drill string through the bit, and returns up the annulus (or, "casing") of the well. Counter-current heat exchange across the drill string (typically steel pipe) causes the hotter returning fluid in the annulus to transfer heat to the downward flowing fluid within the tubing as it flows towards the bit. This counter current heat transfer essentially limits the cooling effect of the drilling mud at the BHA, even at very high flow rates.

The counter current heat exchange can be reduced by two mechanisms: reducing the temperature difference between the casing and tubing fluids or increasing the thermal resistance for annular heat transfer.

Existing geothermal wells can reach above 200° C. or even above 400° C. rock temperature. Therefore, these wells are limited to vertical orientation and are unable to use modern sensors, measurement, and directional drilling equipment. In certain cases, the bit is cooled effectively due to lost circulation—a situation where the pumped drilling fluid goes down the drill string, exits the drill bit, cools the bottom hole assembly and flows out into highly permeable geological formations without returning to surface (hence, circulation is "lost"). In this lost circulation scenario, counter-current flow of hot fluid up the annulus is eliminated and the standard drilling mud effectively cools the BHA.

These lost circulation formations are rare in oil, gas, and geothermal projects and it is much more common to find tight impermeable formations than highly permeable zones. Furthermore, having good mud circulation (majority of pumped fluid returns up the annulus) is necessary for other critical functions of a drilling fluid outlined above.

In addition to cooling, a second challenge in drilling hard rock geothermal wells is the high rock strength and resulting low rate of penetration with existing drilling technology. Rate of penetration is primarily a function of rock strength, which can be measured and quantified in several ways, such as Unconfined Compressive Strength (UCS) or Brazilian Tensile Strength. Kahraman et al. discuss salient points in, *Dominant rock properties affecting the penetration rate of percussive drills*, International Journal of Rock Mechanics & Mining Sciences 40 (2003) 711-723 and Nguyen van Hung et al. *Penetration rate prediction for percussive drilling with rotary in very hard rock.* Journal of Science and Technology, Vietnam Academy of Science and Technology, 2016, 54 (1), pp. 133-149.

A third challenge when drilling a closed-loop geothermal system is intersecting the wellbores at high temperature. Magnetic ranging technology involves placing an emitter tool in one well, and a receiving tool in the other well, to sense relative distance, inclination, and azimuth between the wellbores. The emitter is typically a rare-earth magnet which can be designed to have a high temperature limit—there are no moving parts or electronics. However, the receiver is necessarily a sensitive magnetometer with electronics and circuit boards. These components are difficult to build to withstand high temperatures and are typically the weakest link of all downhole equipment required to construct closed loop geothermal wells.

With the goal of addressing the temperature issues, the prior art has focussed on the use of phase change materials (PCM) to mitigate the counter-current heat exchange complications inherent with standard drilling fluid. As is known, PCMs undergo fusion (melting and solidifying) at a constant temperature—hence, they absorb and release thermal energy without changing temperature materially. This has been explored in the prior art, an example of which is U.S. Pat. No. 9,758,711, issued Sep. 12, 2017, to Quintero et al.

In the document, a PCM drilling mud composition was used, however, it was noted that only marginally better cooling could be achieved (approximately 5° C.) compared to water. In order to achieve a material impact on ROP, cooling of greater than 50° C. is required.

When the methods described here are applied the rock can be cooled by greater than 100° C. The example used in this document shows cooling of 190° C.

Academic literature shows the rock weakening effect is related to the magnitude of cooling. To achieve a material impact on ROP, cooling of greater than 50° C. is required. Substantial weakening and tensile failure can occur with 150° C. of cooling, which cannot be achieved with water alone.

Monteiro et al., in Temperature Control of Drilling Fluid with Phase-Change Materials. AIChE Annual Meeting, Conference Proceedings, 2012, discuss "the effect of different types of PCMs in drilling fluids. A mathematical model of the circulating fluid in a wellbore is developed and used to investigate the potential gains in temperature of at the BHA. The article also presents the results of a series of experiments with different materials highlighting the challenges in using them in wellbore applications."

The conclusions reached were: "Phase-change materials have been proposed as an approach to improve the cooling capabilities of drilling fluids for HPHT wells. The maximum benefit of PCMs will depend on the latent heat of the phase change as well as the phase change temperature with respect to the temperature profile of the fluid in absence of the PCM. There is an optimal phase change temperature that maximizes the decrease of fluid temperature at the bottom of the well.

A particular challenge among the materials tested here was the form stability, which is critical or nano-encapsulated materials appear as a promising option to mitigate this problem. Moreover, in a PCM with a shell-core morphology, the shell material may be chosen with a specific (sensible) heat that also contributes for the lowering the fluid temperature."

In United States Patent Publication No. 20050104029, Neuscuetz, discloses the Use of paraffin-containing powders as phase-change materials (PCM) in polymer composites in cooling devices. Paraffin based polymeric composites are disclosed for the storage of heat, comprising polymers, a silica matrix in which the PCMs are embedded, and optionally additives and/or auxiliaries. They are used to control the temperature to which electronics are exposed.

Further efforts in the prior art can be seen with the teachings of Di Foggio in United States Patent Publication US 20080277162, published Nov. 13, 2008. In one embodiment, there is discussed a method for controlling heat flow in a downhole tool where a first quantity of heat is conducted through a thermal rectifier material along a heat flow path in a first direction away from a heat source and toward a heat sink. A second quantity is also conducted along the heat path, with the second quantity of heat being less than the first. The second quantity of heat flows away from the heat sink and toward the heat source in a second direction. The use of nanotubes is also disclosed.

The present invention addresses the limitations of heat management in drilling operations using a PCM containing drilling fluid to result in heat issue mitigation. This results in previously unrecognized avenues for drilling in high temperature environments.

SUMMARY OF THE INVENTION

One object of the present invention is to provide an improved drilling fluid which allows for higher rate of penetration into high temperature formations, such as geothermal formations.

By selecting the fluid composition appropriately, a chemical mechanism is introduced to reduce the counter-current heat exchange between annulus and tubing in a drilling apparatus. This results in substantial cooling at the rock face.

The chemical mechanism can involve phase change materials which reduce the temperature differential between the tubing and annulus as a primary example.

Another example is to select an endothermic chemical reaction which reduces or reverses the temperature differential from tubing to annulus, thus reducing or eliminating heating of the fluid within the tubing via counter-current heat exchange.

A further example is to select a fluid which has a positive Joule-Thompson effect, and by controlling the flow rate, and the pressure drop between annulus and tubing, the fluid can be reduced to a lower temperature than the tubing during a portion of the well, thus reducing or eliminating counter current heat exchange from annulus to tubing.

Another object of one embodiment of the present invention is to provide a method of controlling the temperature of a drilling fluid during a drilling operation, the operation utilizing a drill string with tubing and a surrounding annulus, by reducing counter-current heat exchange between the tubing and the annulus by using a chemical mechanism within the drilling fluid.

In one example, the chemical mechanism includes providing a drilling fluid containing a phase change material and controlling a pressure differential between the tubing and the annulus where maximum fusion temperature of the phase change material in the annulus is lower or equal to the minimum fusion temperature of the phase change material in the tubing.

The flow rate of the phase material may be maintained to retain at least partial solid state adjacent the bottom of the tubing whereby the drilling fluid is at a lower temperature than that of a formation face being drilled.

In embodiments, the drilling fluid may include reagents within said drilling fluid that react endothermically and the reaction may be pressure activated or temperature activated.

Further still, the reaction may be spontaneous with reagents being provided in separate tubing strings that combine downhole at a target depth.

In other embodiments, the step of an insulative drilling fluid may be used which increases convective heat transfer thermal resistance in the system.

For fine tuning the operation of the method, the drilling fluid temperature is maintained through active phase change of the phase change material during circulation of the drilling fluid. Flow rate is selected based on formation temperature.

Operational parameters of the Bottom Hole Assembly may be selected to induce a desired hydraulic pressure drop across the BHA at the selected flow rate. Operational parameters at least include PCM compositional chemistry, carrier fluid composition, PCM volume %, flow rate and pressure drop between the tubing and the annulus.

The PCM undergoes solidification and releases heat in a region of a wellbore being drilled where the initial temperature of the rock exceeds the melting temperature of the PCM. The initial temperature of the rock and the melting temperature are at least 80° C.

The formation is a thermally productive formation which may be a geothermal formation.

The drilling operation includes drilling an inlet wellbore, an outlet wellbore and an interconnecting wellbore positioned within the geothermal formation and interconnecting the inlet wellbore and the outlet wellbore in a closed loop.

In respect of temperatures, the formation face may have a temperature greater than 200° C.

In embodiments, the rock face may be preconditioned for drilling by contacting the rock face with cool drilling fluid to induce fragmentation at the rock face and increase the rate of penetration during drilling.

A further object of one embodiment of the present invention is to provide a method of controlling the temperature of a drilling fluid during a drilling operation, the operation utilizing a drill string with tubing and a surrounding annulus, comprising: providing a drilling fluid containing a phase change material; controlling a pressure differential between the tubing and the annulus where maximum fusion temperature of the phase change material in the annulus is lower or equal to the minimum fusion temperature of the phase change material in the tubing; maintaining flow rate of the phase change material to retain at least partial solid state adjacent a bottom of the tubing whereby the drilling fluid at a lower temperature than that of a formation face being drilled.

As discussed in the prior art, phase change materials have distinct utility for downhole cooling requirements. Many commercially available PCMs undergo the phase change process over a limited range of temperatures for example, melting at 145° C. with transition completion to liquid at 150° C. This can be defined as the melting process initiating at the Minimum Fusion Temperature (145° C.) and the melting process finishing at the Maximum Fusion Temperature (150° C.).

In terms of PCM fusion temperature, this is usually defined as the temperature at which the PCM begins to melt, however, here it is more accurately defined as the average meting temperature at standard pressure, since PCM phase transition generally occurs over a temperature range and the PCM fusion temperature is a function of pressure.

As is well known to those skilled, in downhole operations there are pressure losses throughout the system. The change in pressure through the system (delta-P) is caused by hydraulic frictional pressure losses as well as large pressure drops across equipment (agitators, power sections, drill bits, etc.) in the bottom hole assembly. Restriction devices or other mechanisms can be used to create a large delta-P between the tubing and annulus fluid.

By setting a pressure, the fusion temperature range is also set. For example, increasing the fluid pressure of a fluid containing a PCM by 10 MPa can increase the fusion temperature of said PCM by several degrees Celsius.

It has been found that these parameters can be manipulated to have the desired cooling effect in a PCM based fluid. For optimum results the system should be designed so that:
  a) the pressure differential, delta-P, between tubing and annulus is sufficiently high to cause the Minimum Fusion Temperature in the tubing to be higher than the Maximum Fusion Temperature in the annulus; and
  b) the flow rate is sufficiently high to deliver the PCM proximate to the bottom of the tubing string in a fully solid or at least partially solid state.

For each set of parameters, there is a "critical flow rate" to deliver the PCM proximate to the bottom of the tubing string in a fully solid or at least partially solid state. Above this critical flow rate, no further cooling of the BHA is achieved. Below this critical rate, the fluid heats up quickly and there is insufficient cooling of the BHA.

Advantageously, it has been found that control of the heat exchange between the tubing and annulus facilitates an ideal thermal shock at the rock face prior to the bit destroying the face. Since the fluid is significantly cooler than the rock face, the result is thermal contraction and fracture or otherwise weakening of the face in advance of the drilling action. This has the significant advantage of increasing the rate of penetration and clearly extends bit life.

Accordingly, it is a further object of one embodiment of the present invention to provide a method for enhancing rate of penetration in a drilling operation with a drill string and a formation with a rock face, comprising: providing a drilling fluid containing a phase change material (PCM); maintaining the flow rate of the drilling fluid at a level sufficient to retain the PCM at least partially in solid state proximate the bottom of the drill string whereby the temperature of the drilling fluid is not less than 50° C. lower than the temperature of the rock face being drilled; preconditioning the rock face for drilling by contacting the rock face with cool drilling fluid to induce fragmentation at the rock face and increase the rate of penetration.

Not surprisingly, the technology herein has particular benefit in facilitating drilling into higher temperature geothermal formations than previously possible. With the unification of enhanced drilling techniques and advances such as those taught in Applicant's co-pending applications and the instant technology, hotter and thus higher energy producing formations can be exploited using conventional, i.e. non heat optimized equipment. This presents an obvious economic advantage realizable on at least two fronts.

As such, a still further object of one embodiment of the present invention is to provide a method of drilling a geothermal closed loop energy recovery arrangement in a high temperature geothermal formation, comprising: providing a drilling fluid containing a phase change material; providing drilling equipment having a maximum rated operating temperature below the geothermal formation temperature; circulating the drilling fluid within the drilling equipment during a drilling operation in the formation whereby the drilling equipment is cooled by the drilling fluid to maintain operability of the drilling equipment; and preconditioning a drilling face of the formation being drilled by exposing the face to drilling fluid having a temperature lower than the face to induce fragmentation at the face.

Building on the geothermal applicability, previous formation restrictions based on requirements of permeability, temperature, geology etc., limiting prior art geothermal techniques are adroitly surmounted by the technology herein.

Amalgamation of improved drilling techniques, phase change material latent heat manipulation and inclusion in the drilling fluid as well as sealing while drilling with further materials in the drilling fluid composition eliminate the constraints inherent with previous geothermal energy recovery.

It is therefore a further object of another embodiment of the present invention to provide a method of forming a closed loop geothermal well having an inlet well, an outlet well and an interconnecting well bore there between in a formation for energy recovery, the formation having a temperature of at least 200° C., comprising: controlling the temperature of a drilling fluid during a drilling operation in the formation, the operation utilizing a drill string with tubing and a surrounding annulus, the drilling fluid containing a phase change material; controlling a pressure differential between the tubing and the annulus where the minimum fusion temperature of the phase change material in the tubing is higher or equal to the maximum fusion temperature of the phase change material in the annulus; and maintaining flow rate of the phase change material to retain at least partial solid state adjacent a bottom of the tubing whereby the drilling fluid at a lower temperature than that of a formation face being drilled.

Irreversible formation damage may be induced to the interconnecting wellbore extending between the inlet well and the outlet well while drilling the wellbore using a chemical mechanism to form an interface between the interconnecting wellbore and the formation substantially impermeable to fluids. The chemical mechanism may involve a reaction with the formation and an alkali-silicate based drilling fluid. This, beneficially, renders prior art concerns with formation permeability and fluid leach there through moot.

In one possible formulation, the drilling fluid may comprise a phase change material in an amount from between 5% and 40% by volume of the fluid; water in an amount between 60% and 95% by volume of the fluid; and balance drilling fluid.

The base fluid may be selected from any of those in the prior art, numerous examples of which are discussed in U.S. Pat. No. 9,758,711, supra. In respect of the phase change material (PCM), a suitable example is paraffin in a water based emulsion. Other available PCMs include sugar alcohols, potassium salts, manganese salts, glycerine, methyl palmitate, bees wax, phenol inter alia.

In the drilling fluid, the alkali silicate may be incorporated to effect the coincident sealing while drilling.

The performance of the invention is calculated with purpose-built thermodynamic modelling software. The software couples a numerical wellbore model with a Phase Change Slurry (PCS) fluid model. The input parameters to the PCS fluid model have been measured using laboratory methods at high pressures and temperatures.

Having thus generally described the invention, reference will now be made to the accompanying drawings.

BRIEF DESCRIPTION OF THE DRAWINGS

Similar numerals used in the Figures denote similar elements.

DETAILED DESCRIPTION OF THE PREFERRED EMBODIMENTS

In general overview, the technology disclosed herein is a drilling fluid composition that cools the drill string, bottom hole assembly and rock face (none of which are shown) much more efficiently than prior art. The cooling drilling fluid employs phase change materials (PCM) to mitigate the counter-current heat exchange issue seen with standard drilling fluid. PCMs undergo fusion (melting and solidifying) at a nearly constant temperature—hence, they absorb and release thermal energy without changing temperature materially.

Figure 1:
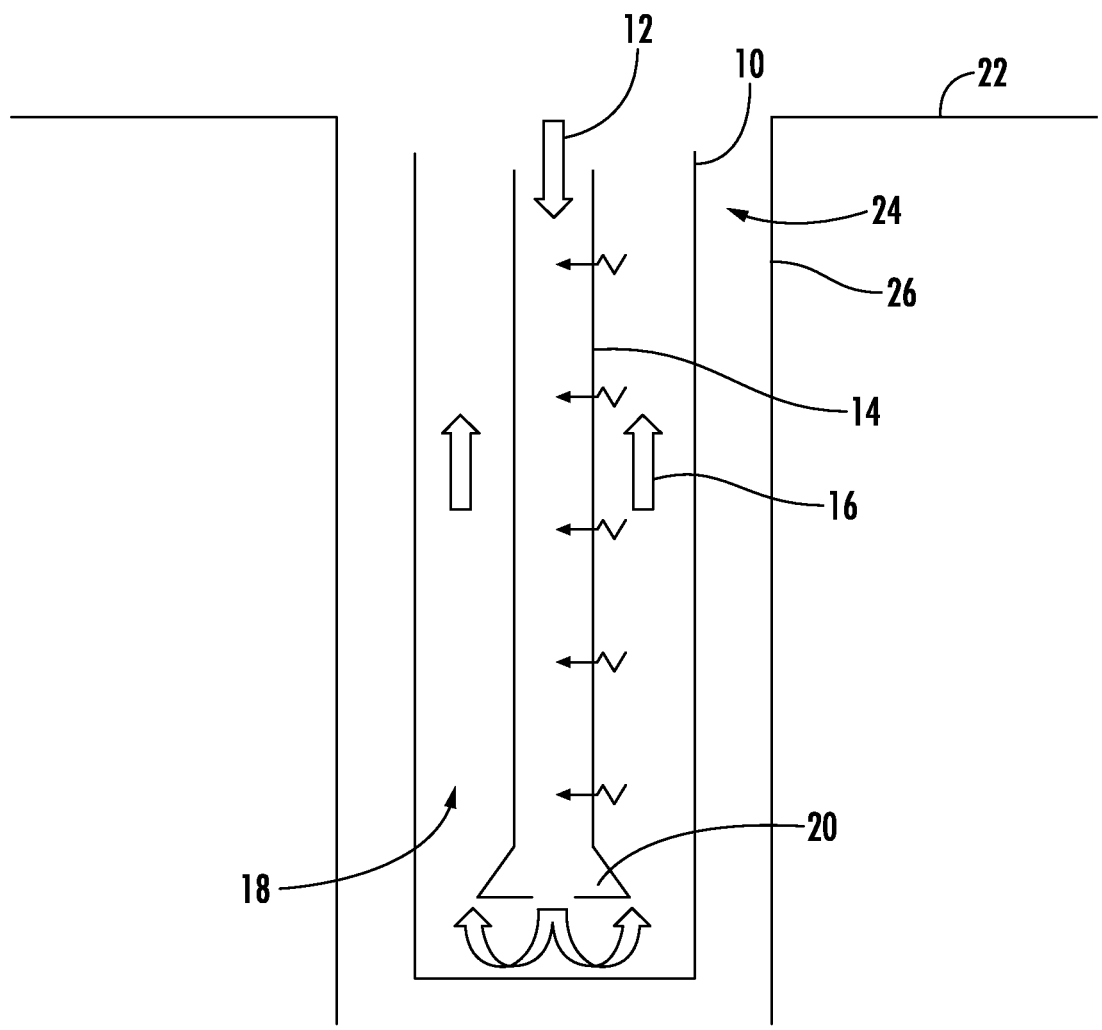
FIG. 1 is a representation showing a typical drilling operation, fluid flow, and heat transfer.

With reference to FIG. 1, the PCMs are added to the drilling fluid, and the fluid is pumped at a sufficient flow rate so that the PCMs undergo a phase change throughout the system (or at minimum proximate the bottom hole assembly (not shown)).

At the top of the drill string 10 (inlet to the system), also referred to as the tubing, the PCMs are pumped in solid state (or mostly solid state). As the fluid 12 descends the tubing 14 of the string 10, heat is transferred from the returning fluid 16 in the annulus 18—however, the heat transfer rate is small due to the close temperature match (low delta T) between the annulus 18 and tubing 14. The fluid 12 in tubing 14 absorbs thermal energy while descending and melts without materially changing temperature and exits the bit 20 either in completely solid state or with a higher liquid fraction than at the top of the tubing 14. As the fluid 16 returns in the annulus 18 it continues to absorb heat from the rock 22 until the near-wellbore rock temperature is lower than the fluid temperature. The thermodynamics of the system are designed so that the flowing PCM slurry in the drill string 10 remains at least partially in solid state at, or near, the bottom hole assembly (not shown).

Figure 2:
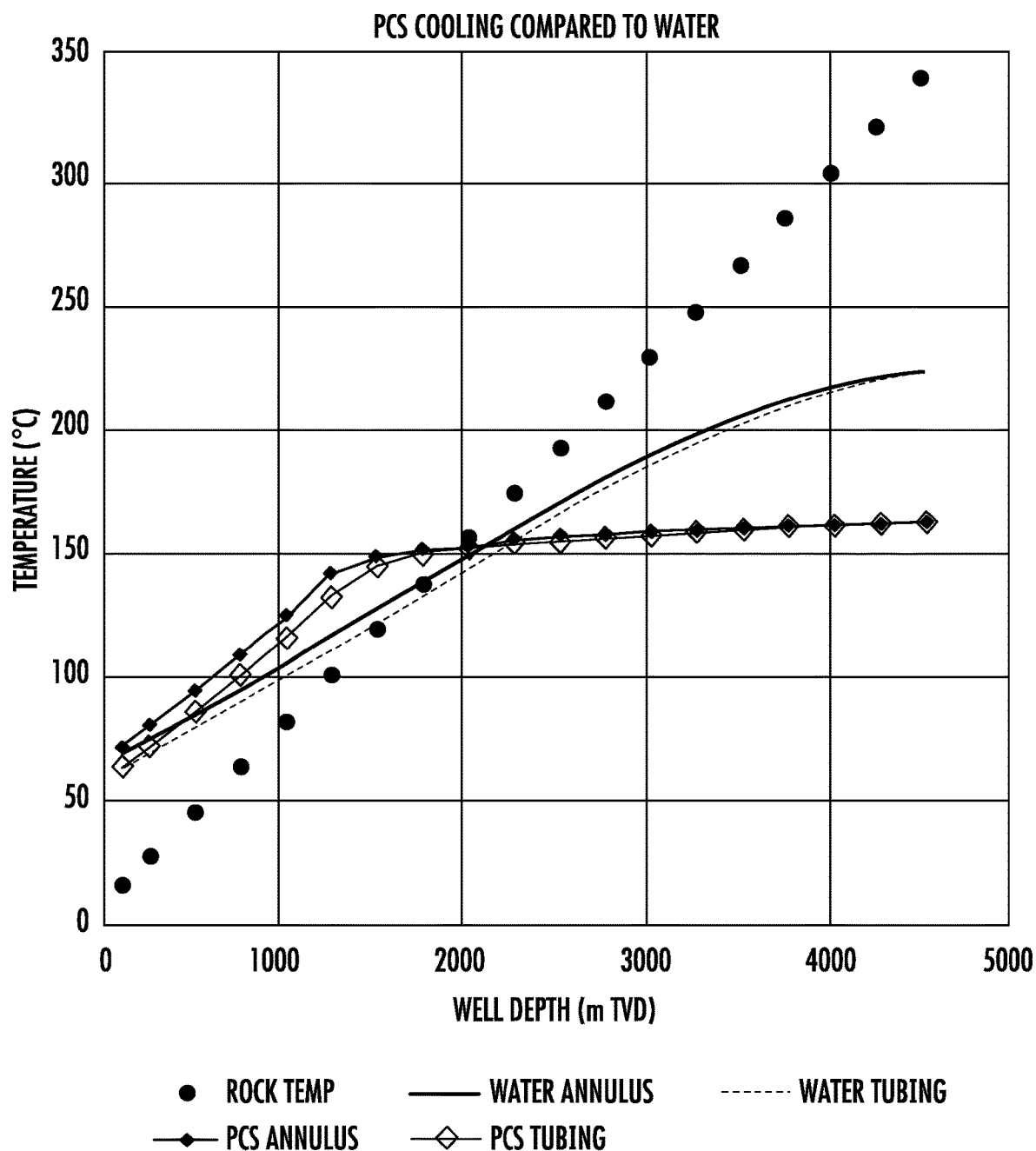
FIG. 2 is a graphical representation of system temperatures for water and the PCM-based drilling fluid disclosed herein along the well length.

Water has diminishing returns. Although effective to a certain point, increasing the flow rate of water has marginal further impact on bottom hole temperature. This is due to the counter-current heat-transfer which heats the descending water before it even reaches the bit (FIG. 1). This is illustrated in FIG. 2 for a case when drilling into 340° C. rock at 4500 m depth. Phase change slurry, (PCS) Casing is the slurry temperature of the returning fluid in the annulus 24 between the casing 26 and drill string 10, when the PCS is flowing at 4 m3/min. With water flowing at 4 m3/min, the temperature at the BHA 9 (not shown) is approximately 222° C. Increasing the water flow rate to 5 m3/min only cools the BHA down to 209° C. The PCS fluid enables cooling down to 160° C. at 4 m3/min, much lower than achievable with water.

As is known in the art, drilling rate of penetration, ROP, is a function of rock strength. It has been found that here can weaken the rock, or "pre-condition" the rock, prior to physical destruction with the bit, by inducing a rapid cooling shock. By maintaining a much lower circulating fluid temperature than the in-situ rock temperature, the cool drilling fluid induces localized thermal contraction in the rock near the bit face (not shown). This contraction causes the rock to weaken and can even cause tensile failure.

In the academic literature, Yan-Jun Shen et al, *Experimental Study on Temperature Change and Crack Expansion of High Temperature Granite under Different Cooling Shock Treatments*, Energies, 2019, discuss the weakening effect is related to the magnitude of cooling. To achieve a material impact on ROP, cooling of greater than 50° C. is required. Substantial weakening and tensile failure can occur with 150° C. of cooling, which cannot be achieved with water alone. U.S. Pat. No. 9,758,711 discloses a PCS drilling fluid to cool the bit and bottom hole assembly. The disclosure notes that only a marginally better cooling effect could be achieved (approximately 5° C.) compared to water.

Figure 3:
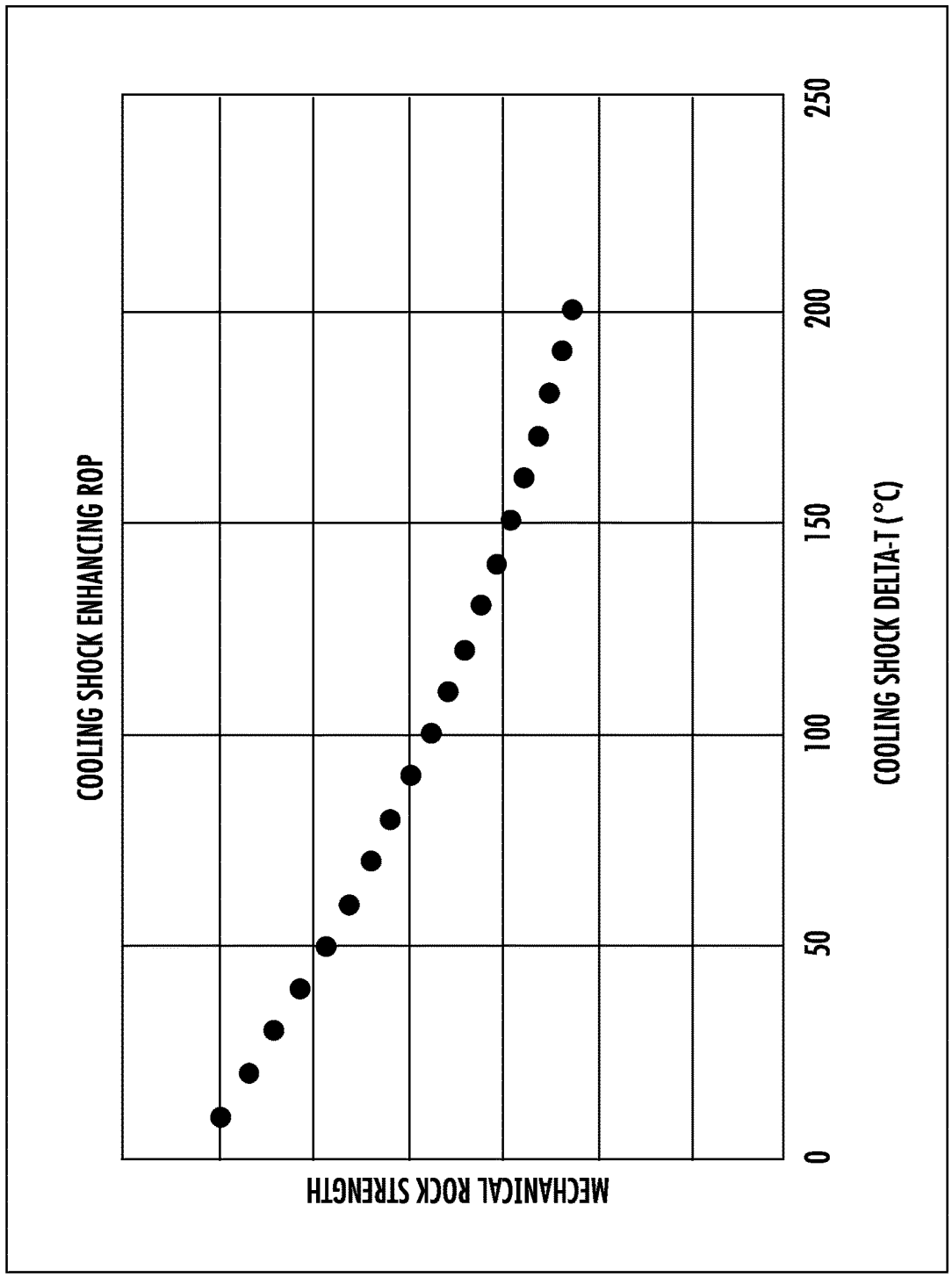
FIG. 3 is a graphical representation of the effect of cooling a rock face for weakening mechanical strength for preconditioning before destruction by a bit.

When the methods described here are applied, the rock can be cooled by greater than 100° C. Reference to FIG. 2 shows cooling of 190° C. FIG. 3 depicts the rock mechanical strength as a function of the shock cooling delta-T, that is, the temperature difference between the PCM drilling fluid and the virgin rock temperature.

A particularly useful application of the invention is for construction of closed-loop, conduction-only geothermal systems as disclosed in Applicant's co-pending applications. These systems typically require magnetic ranging tools to enable intersection of the various wellbores to create a closed system. During the ranging phase of operations, it is critical to keep the magnetic ranging receiver (not shown) below its temperature limit. The receiver can be placed on the end of a drill string (tubing) and configured to allow fluid to flow through the tool and out of the end of the tubing. In this manner, the magnetic ranging equipment can be actively cooled by pumping a PCS at high rates through the tool and back up the annulus, using the design and operational methodology described herein.

The PCMs are designed and selected to have a fusion temperature below the maximum temperature limit of the equipment, electronics, and sensors within the drill string and BHA. Therefore, even though the rock temperature can be significantly higher than the equipment maximum temperature limit, the drilling fluid temperature remains at the PCM fusion temperature. Rock temperatures above 200° C. to 400° C. and greater can be drilled with standard directional drilling equipment, electronics, etc. Furthermore, some wells are currently drilled with expensive high temperature tools up to 250° C. In contrast, the technology disclosed herein enables much cheaper, more reliable and effective equipment, saving significant costs.

As mentioned supra, U.S. Pat. No. 9,758,711, discloses a PCS drilling fluid to cool the bit and bottom hole assembly. However, the disclosure does not enable sufficient cooling to weaken rock for faster ROP, or solve the operational challenges necessary to achieve a massive cooling effect.

It is important to maintain dispersion of the PCM within the drill string to prevent agglomeration and potential plugging of the flow path. There are three effective ways to accomplish this, namely viscosifying the carrier fluid sufficiently, emulsifying the PCM particles inside the carrier fluid, or by adding a dispersant such as a wax crystal modifier; combinations of these procedures may also be used. It has been found that stable fluids are achievable with solid phase PCM particles. However, after several melting/solidifying cycles the PCM particles, with some formulations, eventually agglomerate and grow bigger causing a potential plugging issue. To prevent plugging in the field it is important to have the solidification process take place when the fluid is turbulent and under high shear rates, which limits the agglomeration to a certain maximum particle size. In addition, it is important to design the process so that the solidification stage takes place in a region of the wellbore where the rock temperature is higher than the melting point of the PCM, thus guaranteeing that in stagnant conditions the PCM heats up rather than solidifies.

The latter point means that heat released by solidifying PCM is rejected to the tubing string rather than the rock, and is rejected at the melting temperature, typically above 80° C.

It has been found that a critical flow rate is required to achieve a significant cooling effect that can weaken the rock, increase ROP, and enable magnetic ranging for a geothermal closed-loop system in high temperature rock. The critical flow rate is defined by that where the PCM remains at least partly solid (therefore undergoing fusion) throughout the entire drill string and exits the bit (or bottom hole assembly) in partially solid form. It is not necessary to have the PCM in solid form in the annulus, only the tubing.

Figure 4:
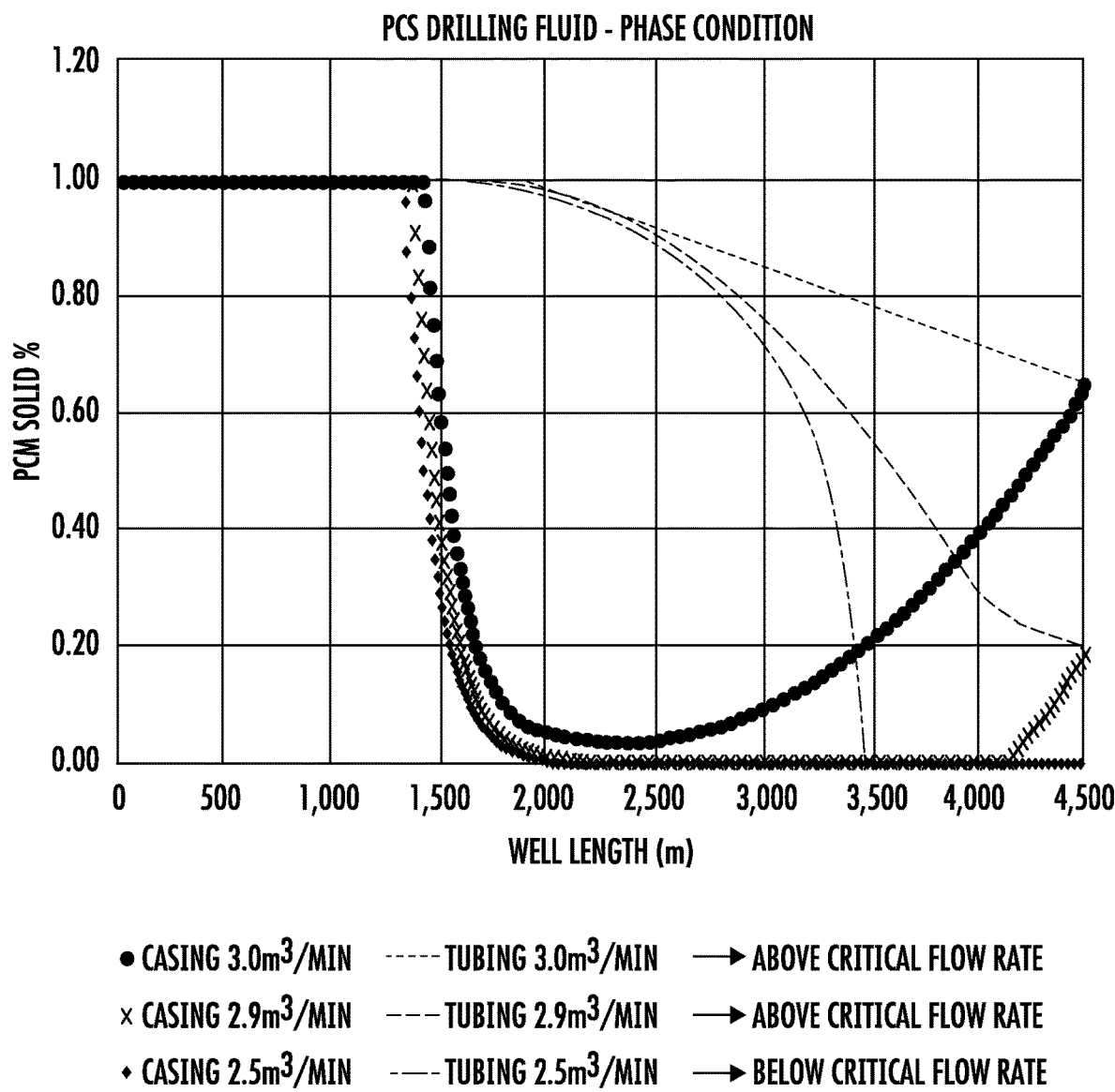
FIG. 4 is graphical representation showing phase state of PCM (Liquid or Solid) along the well length for different flow rates above and below the critical flow rate.

Referring now to FIG. 4, different flow rates for a scenario of drilling 340° C. rock (a linear 75° C./km geothermal gradient) at 4500 m depth, with a fusion temperature of 150° C., are illustrated. The temperature at the bottom hole assembly for each flow rate is 180°, 150°, 150° C., for 2.5, 2.9, 3.0 m3/min, respectively. Therefore, the critical flow rate is 2.9 m3/min in this scenario, as any lower flow rate results in higher temperatures at the BHA, while any higher flow rate results in no additional cooling.

For depths and temperatures relevant to geothermal projects, typically the critical flow rate is between 2 m3/min and 6 m3/min.

Figure 5:
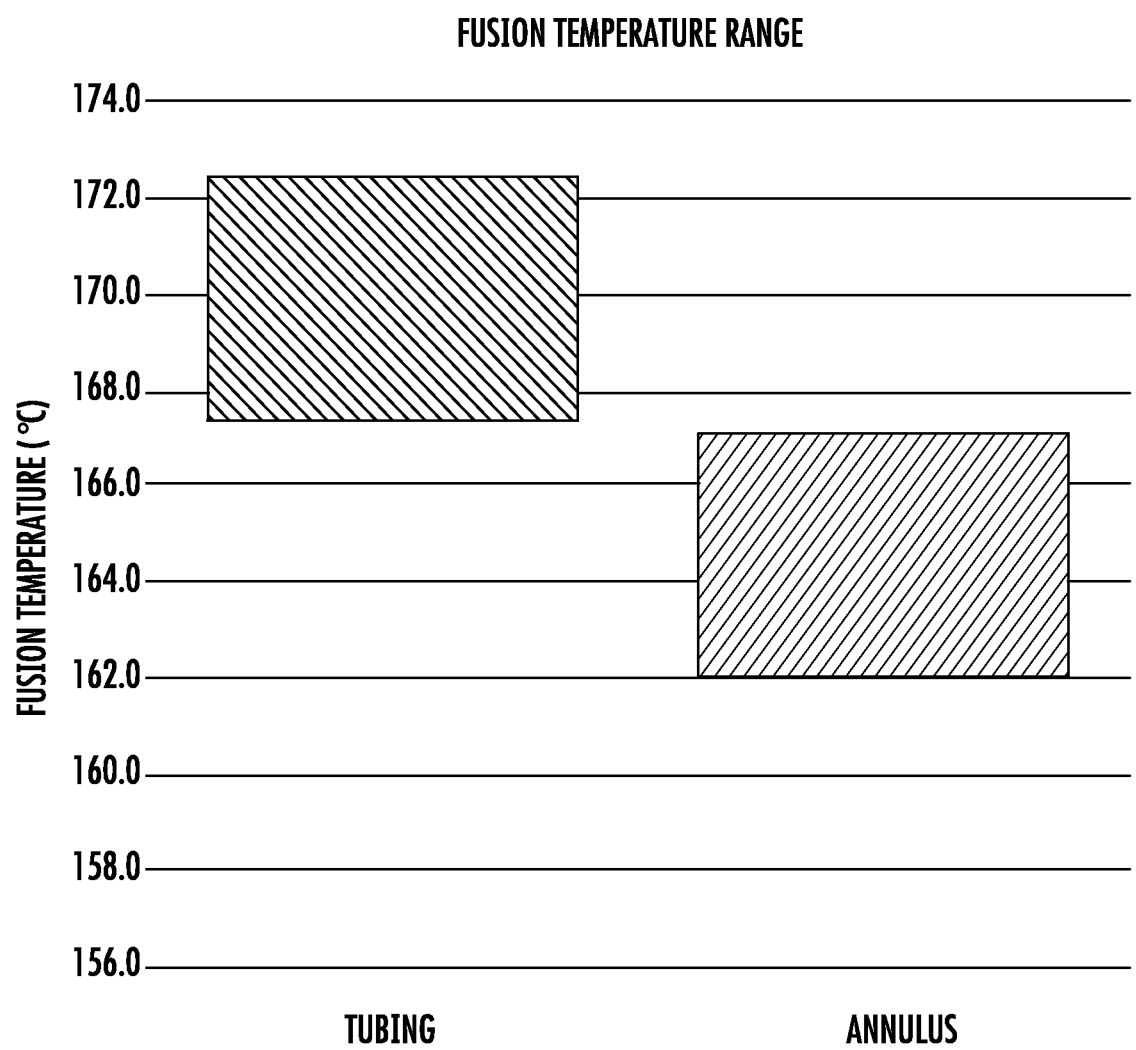
FIG. 5 is a graphical representation of the fusion temperature range in the tubing and annulus which is controlled by pressure.

To achieve the desired cooling effect, it is important that the heat transfer between tubing and annulus is minimized. If the BHA pressure is not controlled properly, the fusion temperature of the melting PCM in the annulus is higher than the fusion temperature in the tubing, causing significant undesired heat transfer from annulus to tubing. Fusion temperature is a function of pressure. The pressure differential, delta-P, between tubing and annulus must be controlled to be sufficiently high to cause the Minimum Fusion Temperature in the tubing to be higher than the Maximum Fusion Temperature in the annulus, depicted in FIG. 5.

Figure 6:
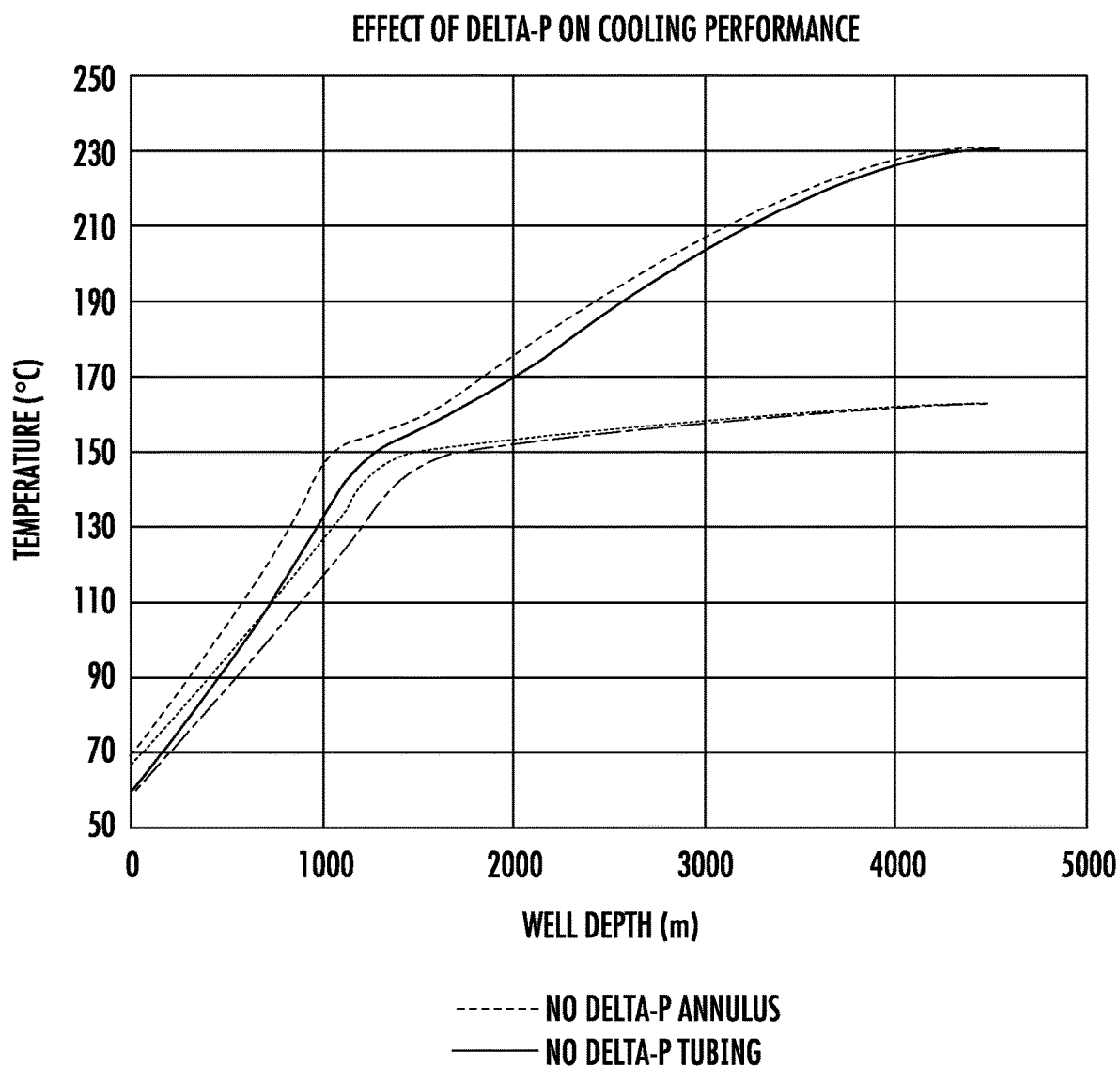
FIG. 6 is graphical representation showing the effect of BHA delta-P on the cooling performance.

FIG. 6 shows a graphical representation showing the importance of properly designing the delta-P across the BHA. It depicts two cases each with identical flow rate, drilling fluid composition, well dimensions, and rock temperature. Case 1 has no pressure drop, or delta-P, across the equipment and components at the bottom of the string (Bottom Hole Assembly). Case 2 has a pressure drop of 10 MPa. The fluid temperature at the bit is 230° C. and 160° C. respectively.

Rock cuttings which are transported to surface need to be removed to maintain the required solids content/density of the drilling fluid. In many geothermal applications and particularly in the application disclosed in Applicant's co-pending applications a clear fluid is ideal—meaning a fluid with immaterial solids content. While larger cuttings are removed via screens/shakers, smaller solids are removed with a centrifuge which separates the higher density material. Therefore, the PCM should be chosen to have a density similar to that of the base carrier fluid, and ideally slightly below the carrier fluid, to enable removal of cuttings in a centrifuge but leave the PCM particles within the fluid.

Adding solid PCM to a base carrier fluid such as water increases the effective bulk viscosity significantly. As viscosity increases, so does the hydraulic frictional pressure drop through the wellbore. The high pressure losses would usually dictate massive surface pumping power and high pressure equipment. However, the PCM can be chosen to have a significant density difference between the liquid and solid states. By combining this PCM property with an optimized fluid composition and flow rate, the system is designed/operated so that the PCM has a significantly higher % solid phase in the drill string than in the annulus, thus creating a large density difference between the drill string and annulus, enabling a significant siphoning effect. The siphoning effect adds a large pressure drive to the system which partially overcomes the impact of the increased viscosity from the PCM.

The density difference is not a thermosiphon as the temperature in the tubing/annulus is essentially the same. Instead the siphon is caused by the relative phase state of the PCM between the annulus and tubing.

Figure 7:
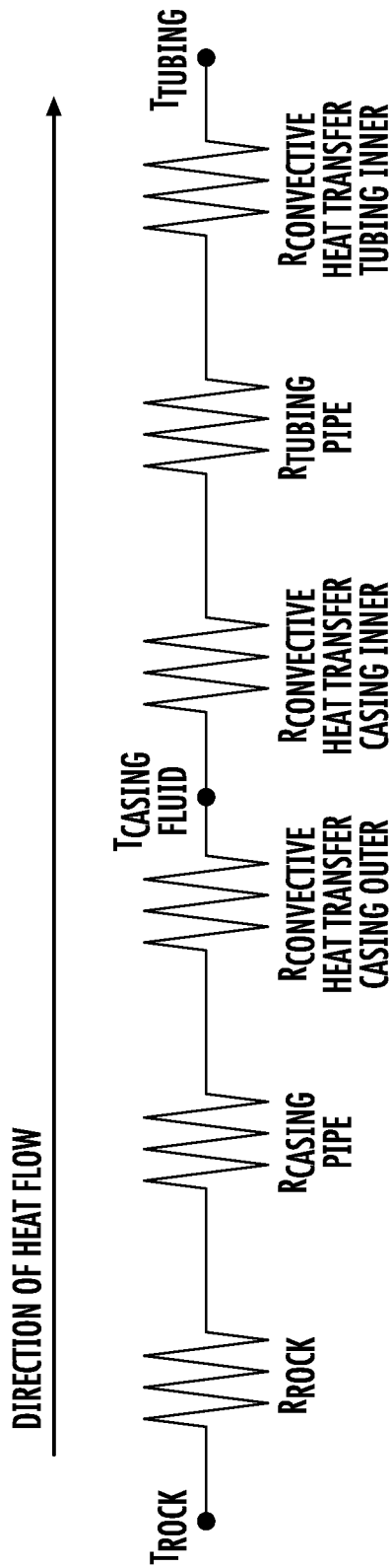
FIG. 7 is a graphical representation showing critical elements of the counter-current heat transfer network.

FIG. 7 is a graphical representation showing the thermal resistance network between the hot rock and the tubing string in a typical drilling arrangement. The heat flows from the rock to the annulus, then through the tubing material to the fluid inside the tubing. The heat flux from the annulus to tubing, q, is proportional to the temperature difference divided by the sum of resistances. It has been found that a chemical mechanism enabled by an appropriate fluid design can significantly decrease the temperature difference, or increase the convective resistance, thus reducing counter current heat transfer.

Figure 8:
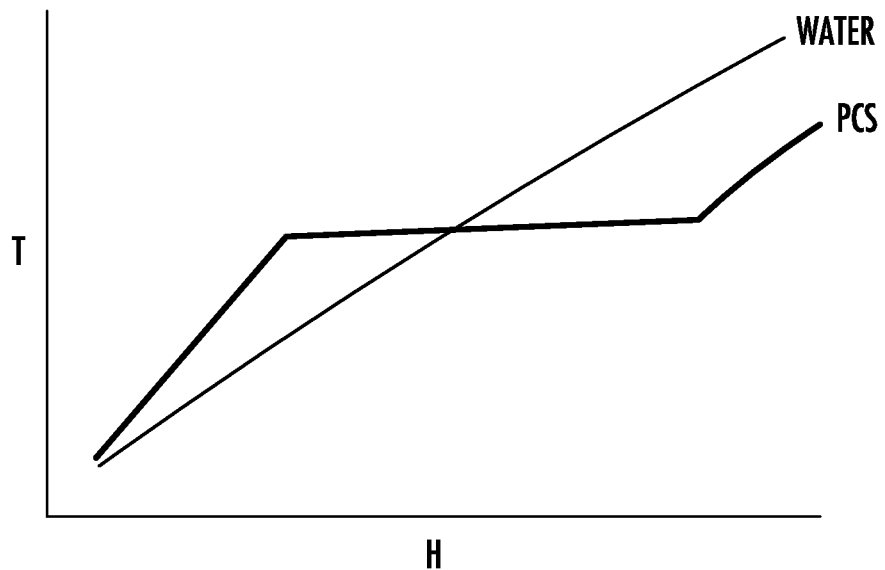
FIG. 8 is a graphical representation of a nonlinear temperature/enthalpy relationship evident in phase change materials.

FIG. 8 is a graphical representation of a nonlinear temperature/enthalpy relationship evident in phase change materials. Although the effective heat capacity of a PCM fluid for the entire temperature range may be less than water, it is the reduction in the counter-current heat exchange which greatly increases the cooling effect at the rock face.

Figure 9:
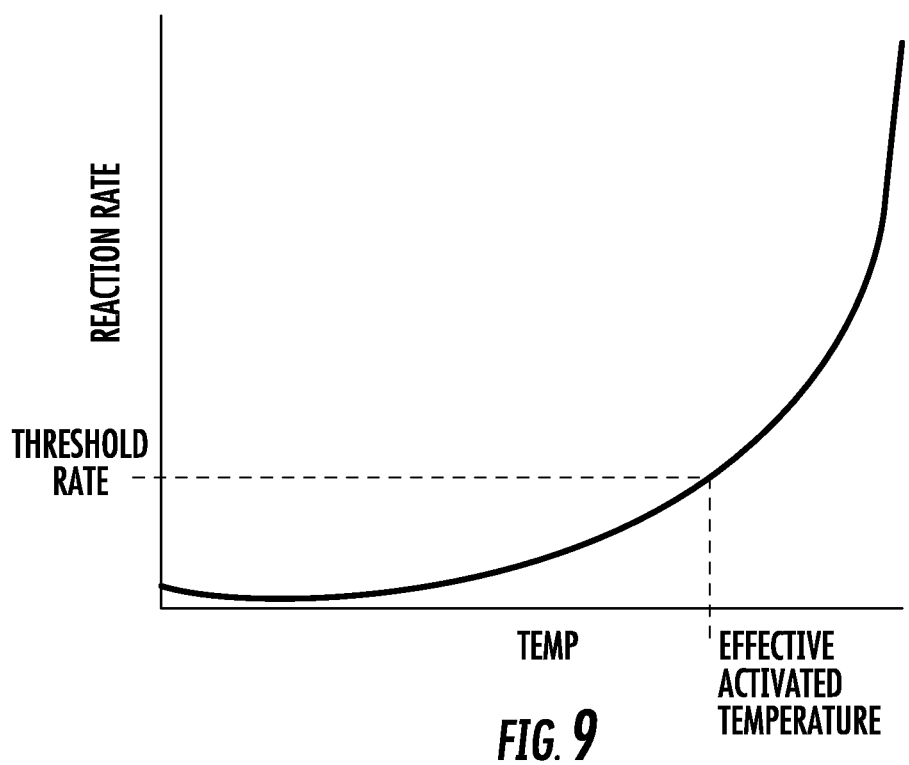
FIG. 9 is a graphical representation of a temperature-activated endothermic chemical reaction.

FIG. 9 is a graphical representation of a temperature-activated endothermic chemical reaction, as another example of a chemical mechanism which reduces the temperature difference between the annulus and tubing and thus reduces counter current heat exchange.

We claim:

1. A method, comprising:
   drilling, with a drill string while flowing a drilling fluid, a wellbore in a formation, the drill string defining, with a wall of the wellbore, an annulus;
   controlling, during drilling, at least one of a temperature, a flow rate, or a pressure of the drilling fluid, to provide a temperature of the drilling fluid exiting the drill bit at least 100° C. lower than a temperature of a rock face of the formation being drilled, reducing counter-current heat exchange between said drill string and said annulus.

2. The method as set forth in claim 1, wherein the drilling fluid comprises a phase change material, and controlling the flow rate comprises maintaining a flow rate of said drilling fluid between 2 cubic meters per minute and 6 cubic meters per minute such that the phase change material in the drilling fluid exiting the drill bit is at least partly in solid state.

3. The method as set forth in claim 1, further comprising including reagents within said drilling fluid that react endothermically, and wherein said reaction is at least one of pressure activated or temperature activated.

4. The method as set forth in claim 1, wherein the drilling fluid comprises a phase change material with a density that is less than or equal to the density of the drilling fluid.

5. The method as set forth in claim 1, wherein the drilling fluid comprises a phase change material that has a fusion temperature that is less than a maximum rated operating temperature of a bottom hole assembly of the drill string.

6. The method as set forth in claim 1, further comprising providing an insulative drilling fluid that increases convective heat transfer thermal resistance.

7. The method as set forth in claim 1, wherein the drilling fluid comprises a phase change material, and said drilling fluid temperature is maintained through active phase change of said phase change material during circulation of said drilling fluid.

8. The method as set forth in claim 1, further comprising selecting said flow rate based on formation temperature.

9. The method as set forth in claim 8, further comprising selecting operational parameters of a bottom hole assembly of the drill string to induce a desired hydraulic pressure drop across the bottom hole assembly at said flow rate.

10. The method as set forth in claim 9, wherein the drilling fluid comprises a phase change material, and said operational parameters at least include a compositional chemistry of the phase change material, carrier fluid composition, volume % of the phase change material, flow rate and pressure drop between said drill string and said annulus.

11. The method as set forth in claim 1, wherein said formation is a geothermal formation and the wellbore comprises a geothermal wellbore for geothermal heat recovery.

12. The method as set forth in claim 1, wherein said rock face of the formation has a temperature greater than 200° C.

13. The method as set forth in claim 1, further comprising preconditioning said rock face for drilling by contacting said rock face with the drilling fluid to induce fragmentation at said rock face and increase the rate of penetration during drilling.

14. The method as set forth in claim 1, wherein the drilling fluid comprises a phase change material that undergoes fusion and releases heat in a region of a wellbore being drilled where an initial temperature of the rock exceeds the melting temperature of the phase change material.

15. The method as set forth in claim 14, wherein said initial temperature of the rock and said melting temperature are at least 80° C.

16. A method, comprising:
   drilling, with a drill string while flowing a drilling fluid comprising a phase change material, a wellbore in a formation, the drill string defining, with a wall of the wellbore, an annulus; and
   controlling, during drilling, a pressure of the drilling fluid, reducing a counter-current heat exchange between the drill string and the annulus, wherein controlling the pressure comprises controlling a pressure differential between said drill string and said annulus where a maximum fusion temperature of said phase change material in said annulus is lower or equal to a minimum fusion temperature of said phase change material in said drill string.

* * * * *